No. 772,069. PATENTED OCT. 11, 1904.
J. M. SWEET.
METAL SECURING RIM FOR ELASTIC WHEEL TIRES.
APPLICATION FILED MAR. 7, 1904.
NO MODEL. 2 SHEETS—SHEET 1.

Witnesses:
J. L. Langner
R. W. Rumer

Inventor.
John M. Sweet
by Wilhelm Parker & Hald
Attorneys.

No. 772,069. PATENTED OCT. 11, 1904.
J. M. SWEET.
METAL SECURING RIM FOR ELASTIC WHEEL TIRES.
APPLICATION FILED MAR. 7, 1904.
NO MODEL. 2 SHEETS—SHEET 2.
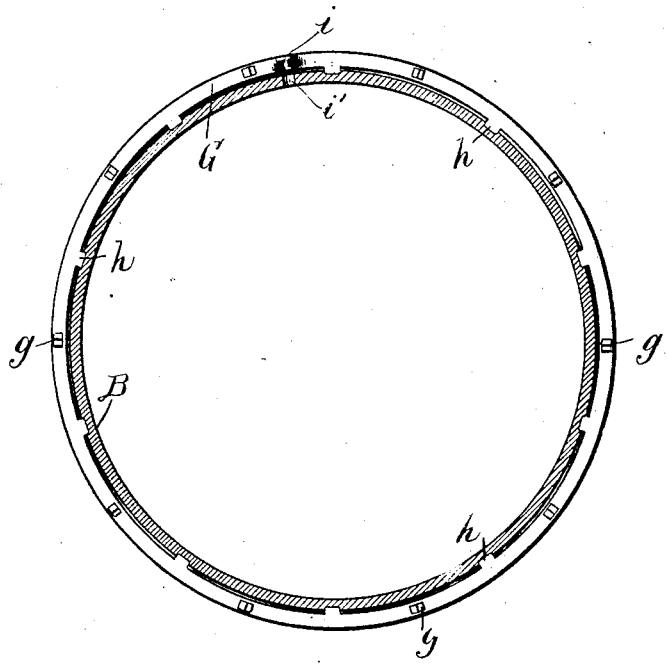
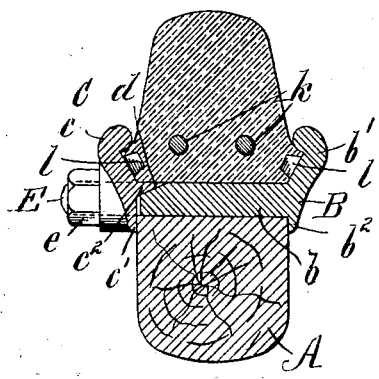
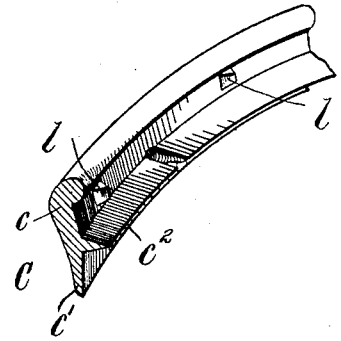
Witnesses:—
J. L. Langner
R. W. Runner
Inventor:
John M. Sweet
by Wilhelm, Parker & Hald
Attorneys No. 772,069. Patented October 11, 1904.

UNITED STATES PATENT OFFICE.

JOHN M. SWEET, OF BATAVIA, NEW YORK, ASSIGNOR TO SWEET TIRE & RUBBER COMPANY, OF BATAVIA, NEW YORK.

METAL SECURING-RIM FOR ELASTIC WHEEL-TIRES.

SPECIFICATION forming part of Letters Patent No. 772,069, dated October 11, 1904.

Application filed March 7, 1904. Serial No. 196,791. (No model.)

*To all whom it may concern:*

Be it known that I, JOHN M. SWEET, a citizen of the United States, residing at Batavia, in the county of Genesee and State of New York, have invented new and useful Improvements in Metal Securing-Rims for Elastic Wheel-Tires, of which the following is a specification.

This invention relates to metal channel-rims for securing rubber or elastic tires to wooden wheels.

The object of the invention is to provide a metallic rim of practical and economical construction which can be securely fastened to the wooden felly without weakening the same by bolts or other devices passing through holes in the felly and which will firmly hold the elastic tire, while at the same time enabling the tire to be quickly secured on and removed from the wheel.

Figure 1:
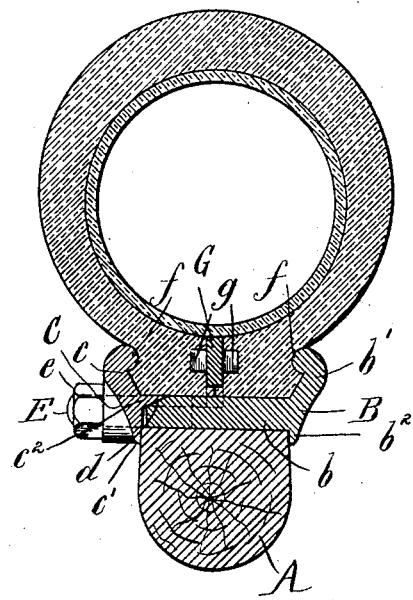
Figures 2, 3:
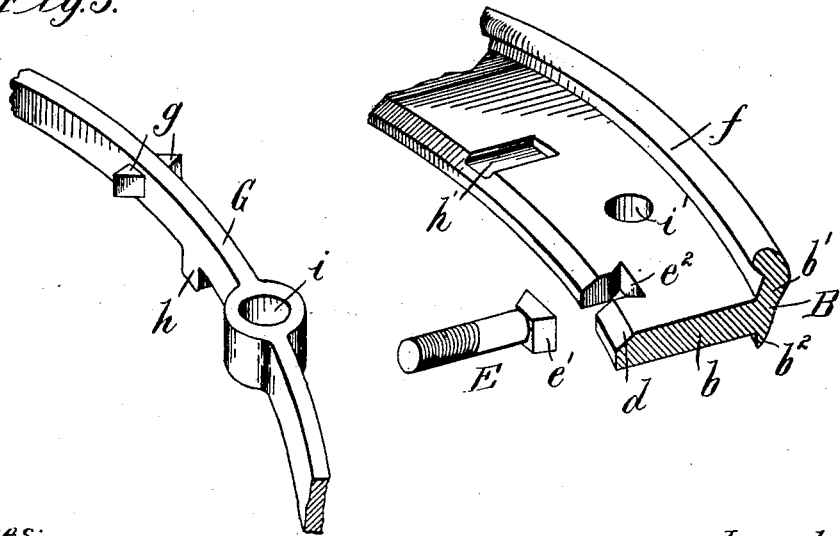

In the accompanying drawings, consisting of two sheets, Figure 1 is a transverse sectional elevation of a wheel-felly, pneumatic tire, and securing-rim embodying the invention. Fig. 2 is a fragmentary perspective view of the stationary channel-rim section, showing one of the securing-bolts for the removable section of the rim detached therefrom. Fig. 3 is a fragmentary perspective view of the retaining-ring employed with pneumatic tires. Fig. 4 is a central sectional elevation, on a reduced scale, of the channel-rim and retaining-ring. Fig. 5 is a transverse sectional elevation of a wheel-felly, cushion-tire, and channel-rim embodying the invention. Fig. 6 is a fragmentary perspective view of the removable section of the channel-rim shown in Fig. 5.

Like letters of reference refer to like parts in the several figures.

A represents the wooden felly of the wheel, which may be of the usual or any suitable construction.

The metal channel-rim in which the elastic tire is held comprises a stationary section B and a removable section C. The stationary section B has a lateral circular body portion $b$, which encircles and tightly fits the outer periphery of the wooden felly and forms, in effect, a metal tire or band for the wheel, an outwardly-extending flange or portion $b'$, forming one side or wall of the receiving-channel for the elastic tire, and an inwardly-projecting flange $b^2$, which embraces and bears against the outer edge portion of the flat side face of the wooden felly. This stationary section of the channel-rim, with the base and flanges $b'$ and $b^2$, is formed in one integral casting of suitable metal and is continuous or unbroken. It is shrunk on the wooden wheel, like the ordinary metal tire, so as to tightly fit the same, be permanently retained thereon, and hold the wooden wheel intact. The other or removable section of the channel-rim consists of an outwardly-projecting flange $c$, which forms the other side or wall of the tire-receiving channel, an inwardly-projecting flange $c'$, which embraces or bears against the outer edge portion of the other flat side face of the wooden felly, and a lateral flange or portion $c^2$, which projects inwardly toward the base of the stationary channel-section. The removable channel-section is also made in one integral casting of continuous or unbroken ring shape. The lateral flange $c^2$ of the removable channel-section is provided with a beveled inner face, which coöperates with and bears on a correspondingly-beveled face $d$ on the outer portion of the flangeless edge of the base of the stationary channel-section to hold the two sections in correct relation.

The two channel-rim sections are secured together and clamped on the wheel-felly by transverse bolts E and nuts $e$, screwed on the threaded outer ends of the bolts. The latter are provided with heads $e'$, of dovetail or other suitable shape, which are removably seated in correspondingly-shaped notches $e^2$ in the flangeless edge of the base of the stationary channel-rim section and pass through bolt-holes in the removable channel-rim section. This manner of securing the bolts to the stationary channel-rim section is desirable, for the reason that a strong bolt of a diameter substantially equal to the thickness of the base of the stationary channel-rim section can be employed, and the latter is not weakened by large transverse bolt-holes, and shorter bolts can be used. The bolts and nuts can also be placed on the inner side of the wheel, if desired, thereby leaving the outer side free from bolts or nuts and improving the appearance of the wheel. The bolts are located at the necessary distance apart around the wheel to properly hold the channel-rim in place. When the nuts $e$ are screwed up on the bolts, the two sections of the channel-rim are drawn together and tightly clamped and held on the wheel-felly by the inwardly-projecting flanges $b^2$ and $c'$ of the stationary and removable sections of the channel-rim. The base of the stationary channel-rim section is preferably made of slightly less width than that of the wooden felly, as shown in Fig. 1, so that the latter can be properly clamped and held between the flanges of the channel-rim sections if it shrinks, and the channel-rim is also thus adapted to wooden fellys which vary slightly in width. The lateral beveled flange of the movable channel-rim section not only holds the two sections in proper relative position, but also acts to contract the base of the stationary channel-rim section about the wheel and maintain a tight fit thereof on the wheel.

The channel-rim as thus far described is adapted for securing both pneumatic and solid cushion tires.

The construction shown in Figs. 1, 2, and 3 is intended especially for securing pneumatic tires of the double-tube type, comprising an inner inflatable tube and an outer split sheath or covering which surrounds the inflatable tube and is provided at its inner side with divided base portions which engage in the channel-rim. The outwardly-projecting flanges of the channel-rim are provided at the inner sides of their outer edges with lips $f$, which overhang side flanges formed on the divided base portions of the split sheath of the tire.

G represents a central metal retaining-ring which is continuous or unbroken and is preferably cast. This ring is located midway of the channel-rim between the adjacent edges of the divided base portion of the split sheath of the tire and is slipped sidewise on the base of the stationary channel-rim section. The retaining-ring holds the elastic tire from creeping or moving longitudinally in the channel-rim, for which purpose it is preferably provided with lateral lugs or projections $g$, which extend into the divided base portions of the split sheath. The retaining-ring is itself held from turning on the channel-rim by inwardly-extending lugs or projections $h$, which engage in lateral or transverse shallow grooves $h'$ in the outer face of the base of the stationary section of the channel-rim and extend from the middle portion to the flangeless edge thereof, thus enabling the retaining-ring to be slipped sidewise into place on the base. The retaining-ring can be held from circumferential movement on the channel-rim by other interlocking portions on the parts, such as projections on the base of the channel-rim entering slots in the inner edge of the retaining-ring. The retaining-ring and base of the channel-rim are provided with suitable holes $i\ i'$, respectively, for the passage of the nipple of the inner inflatable tube of the tire. The internal diameter of the retaining-ring is preferably somewhat greater than the external diameter of the base of the stationary channel-rim section, as indicated in Fig. 4, for as both parts are cast there is apt to be some roughness or unevenness of their surfaces, and if made to fit closely they would require machining or truing up, which is thus avoided. The retaining-ring not only prevents the circumferential creeping of the tire in the channel, but also adds greatly to the secure attachment of the tire in the channel, as it prevents the divided base portions of the split sheath from being twisted or rolled sidewise out of the channel. To place the tire on the wheel, one side of the base of the sheath is first slipped sidewise into place on the base of the channel-rim before the removable section thereof and the retaining-ring are put in place. The retaining-ring and other portion of the base of the split sheath are then slipped sidewise on the base of the channel-rim and the removable section of the rim secured in place. When the securing-nuts for the removable rim-section are tightened up, the base of the tire is tightly compressed between the flanges of the channel-rim and is very firmly held in the channel. The tire can be quickly and easily removed from the wheel by detaching the removable channel-rim section and slipping the tire and retaining-ring off of the base of the channel-rim.

In the construction shown in Figs. 5 and 6 the channel is constructed and secured to the wheel-felly in the manner explained; but the solid-cushion tire is secured in the channel by the usual circumferential retaining wires or bands $k$, and the retaining-ring G is not employed. The solid-cushion tire is preferably held from longitudinal movement or creeping in the channel by inwardly-extending lugs or projections $l$ on the outwardly-projecting flanges or walls of the channel, which sink into the base portions of the tire. The pneumatic tire could also be held from creeping in the channel by projections on the flanges of the channel similar to those shown in Figs. 5 and 6; but the retaining-ring G, with its projections, is believed to be a better construction.

I claim as my invention—

1. The combination with a wheel, and an elastic tire having shoulders at its sides, of a metal channel-rim comprising two sections having inwardly-projecting flanges which embrace the sides of the wheel-felly and outwardly-projecting flanges between which the elastic tire is held and which have lateral holding-lips which engage said shoulders on the tire to hold the latter, one of said sections having a base portion encircling the wheel, and lateral bolts arranged in the plane of said base portion for drawing said sections together to clamp the wheel-felly and secure the tire, substantially as set forth.

2. The combination with a wheel, and an elastic tire, of a metal channel-rim comprising a stationary section having an inwardly and an outwardly projecting flange, and a lateral base portion which encircles the wheel, and a removable section having an inwardly and an outwardly projecting flange, bolts removably secured to the base portion of said stationary section of the rim and passing through bolt-holes in the removable rim-section, and nuts screwed on the outer ends of said bolts, substantially as set forth.

3. The combination with a wheel, and an elastic tire, of a metal channel-rim comprising a stationary section having an inwardly and an outwardly projecting flange and a lateral base portion which encircles the wheel, and a removable section having an inwardly and an outwardly projecting flange, bolts removably secured to the base portion of said stationary section of the rim and passing through bolt-holes in the removable rim-section, and nuts screwed on the outer ends of said bolts, said removable rim-section having a lateral flange which surrounds the adjacent edge of said base portion of the stationary rim-section, substantially as set forth.

4. The combination with a wheel, and an elastic tire, of a metal channel-rim comprising a stationary section having an inwardly and an outwardly projecting flange and a lateral base portion which encircles the wheel, and a removable section having an inwardly and an outwardly projecting flange, bolts removably secured to the base portion of said stationary section of the rim and passing through bolt-holes in the removable rim-section, and nuts screwed on the outer ends of said bolts, said removable rim-section having a lateral flange provided with a beveled inner face which bears on a beveled face of the adjacent edge of said base portion of the stationary rim-section, substantially as set forth.

5. The combination with a wheel, and an elastic tire having a divided base portion, of a channel-rim comprising separable sections having inwardly-projecting flanges to embrace the wheel-felly and outwardly-projecting flanges between which the elastic tire is held, one of said sections having a base portion which encircles the wheel, means connecting said rim-sections, a removable retaining-ring surrounding said base portion of the channel-rim between the divided portions of the tire, and interlocking parts on said retaining-ring and base portion of the channel-rim to hold said ring from circumferential movement, substantially as set forth.

6. The combination with a wheel, and an elastic tire having a divided base portion, of a channel-rim comprising separable sections having inwardly-projecting flanges to embrace the wheel-felly and outwardly-projecting flanges between which the elastic tire is held, one of said sections having a base portion which encircles the wheel, means connecting said rim-sections, a removable retaining-ring surrounding said base portion of the channel-rim between the divided portions of the tire and having lateral projections engaging the elastic tire to hold the latter from circumferential movement, and means for holding said retaining-ring from circumferential movement, substantially as set forth.

Witness my hand this 29th day of February, 1904.

JOHN M. SWEET.

Witnesses:
FRANK RICHARDSON,
BLANCHE LOWE.